(12) United States Patent
Noseworthy

(10) Patent No.: US 7,520,477 B2
(45) Date of Patent: Apr. 21, 2009

(54) BRACKET FOR INDUSTRIAL PIPING

(76) Inventor: Jim Noseworthy, Apt. 3109, 101 Lotit Road, Fort McMurray, Alberta (CA) T9K 2N5

( * ) Notice: Subject to any disclaimer, the term of this patent is extended or adjusted under 35 U.S.C. 154(b) by 545 days.

(21) Appl. No.: 11/186,903

(22) Filed: Jul. 22, 2005

(65) Prior Publication Data
US 2006/0102806 A1 May 18, 2006

Related U.S. Application Data

(60) Provisional application No. 60/627,894, filed on Nov. 16, 2004.

(51) Int. Cl.
*F16L 3/12* (2006.01)
(52) U.S. Cl. ............... 248/74.3; 248/62; 248/230.8
(58) Field of Classification Search ............. 248/74.3, 248/62, 219.4, 218.4, 230.8
See application file for complete search history.

(56) References Cited

U.S. PATENT DOCUMENTS

| | | | | |
|---|---|---|---|---|
| 1,882,555 A * | 10/1932 | Gray | .................. | 248/74.3 |
| 4,152,577 A * | 5/1979 | Leavines | .................. | 392/468 |
| 4,632,453 A * | 12/1986 | Robbin et al. | .................. | 297/243 |
| 6,948,690 B1 * | 9/2005 | Sandel | .................. | 248/218.4 |
| 7,260,320 B2 * | 8/2007 | Stanzel et al. | .................. | 392/468 |
| 2005/0017133 A1 * | 1/2005 | Wochnick | .................. | 248/74.1 |

* cited by examiner

*Primary Examiner*—Gwendolyn Baxter
(74) *Attorney, Agent, or Firm*—Ogilvy Renault LLP

(57) ABSTRACT

A bracket adapted to be releasably mounted on industrial pipes of various diameters to support various pieces of equipment at a certain distance away from the pipes. The bracket comprises a base having an arcuate bottom pipe engaging surface adapted to be positioned against an outer surface of a pipe. Banding is provided for releasably securing the base in place on the pipe. An upstanding rail extends at right angles from the base for adjustably receiving therealong a fastening device carrying an accessory to be mounted on the pipe.

3 Claims, 3 Drawing Sheets

BRACKET FOR INDUSTRIAL PIPING

RELATED APPLICATIONS

This application claims priority from U.S. Provisional Application No. 60/627,894 filed on Nov. 16, 2004, the contents of which is incorporated herein by reference.

BACKGROUND OF THE INVENTION

1. Field of the Invention

The present invention relates to brackets and, more particularly, to a universal support bracket for mounting equipment on industrial pipes.

2. Description of the Prior Art

Over the years various brackets have been developed for securing pipes, such as those used in the plumbing industry, to surrounding structural members of a building. On the other hand, according to the applicant's knowledge, very few brackets exist for mounting equipment directly on insulated or non-insulated industrial pipes, such as the pipes used in the gas/oil and water treatment industries. Presently, what is being used in the industry to mount components on industrial pipes are costly custom built support systems welded to structural steel, which is subject to corrosion from chemicals used in the oil, gas, petrochemical and water treatment industries. Such brackets cannot be mounted directly on the protective sheet covering industrial insulated pipes.

There is thus a need for a new bracket that can be readily installed on a wide variety of industrial pipes in order to support pieces of equipment thereon.

SUMMARY OF THE INVENTION

It is therefore an aim of the present invention to provide a new bracket for supporting components on industrial pipes.

It is also an aim of the present invention to provide a new bracket that can be mounted to industrial piping without damage to the pipe insulation liner and without heat transfer to the items mounted on the bracket.

Therefore, in accordance with the present invention, there is provided a bracket for mounting equipment on a member, comprising a saddle adapted to be positioned against an outer surface of the member, a connector for releasably securing said saddle in position on the member, and an upstanding rail projecting from said saddle and along which a fastening device carrying a piece of equipment to be mounted on the member is slidably received and releasably securable at various axial position therealong.

In accordance with a further embodiment of the present invention, there is provided a bracket adapted to be releasably mounted on industrial pipes of various diameters to support various pieces of equipment at a certain distance away from the pipes, the bracket comprising a base having an arcuate bottom pipe engaging surface adapted to be positioned against an outer surface of a pipe, an attachment member for releasably securing the base in place on the pipe, said attachment member being adjustable to accommodate pipes of different diameters, and a rail extending from the base in a direction away from said arcuate bottom surface thereof, said rail being adapted to adjustably receive therealong a fastening device carrying an accessory to be mounted on the pipe.

In accordance with a still further general aspect of the present invention, there is provided a bracket adapted to be releasably mounted on industrial pipes of various diameters to support various pieces of equipment at a certain distance away from the pipes, the bracket comprising a rail having first and second opposed axial ends, said rail defining an axially extending channel between the first and second ends thereof, said channel being adapted to slidably receive a fastening device carrying a piece of equipment to be mounted on a pipe, a base provided at said first axial end of said rail, said base having an arcuate bottom surface adapted to be positioned against an outer surface of the pipe, and a clamp for releasably securing said base in place on the pipe.

In accordance with a further general aspect of the present invention, there is provided a bracket adapted to be mounted to a surface for supporting various pieces of equipment at a certain distance away from the surface, the bracket comprising a base having a bottom surface adapted to be placed against the surface to which a piece of equipment has to be mounted, fastening means for securing said base in position on the surface, and a rail extending from the base in a direction away from said bottom surface thereof, said rail being adapted to adjustably receive therealong a fastening device carrying the piece of equipment to be mounted on the surface.

In accordance with a further general aspect of the present invention, there is provided a bracket and pipe arrangement comprising a pipe, a bracket and a piece of equipment to be mounted to the pipe, the bracket supporting the piece of equipment at a certain distance away from the pipe, the bracket comprising a base having a bottom surface embracing an outer surface of the pipe, fastening means for securing said base in position on the outer surface of the pipe, and a rail extending from the base in a direction away from said bottom surface thereof, said piece of equipment being adjustably mounted along said rail and securable at various axial positions therealong.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
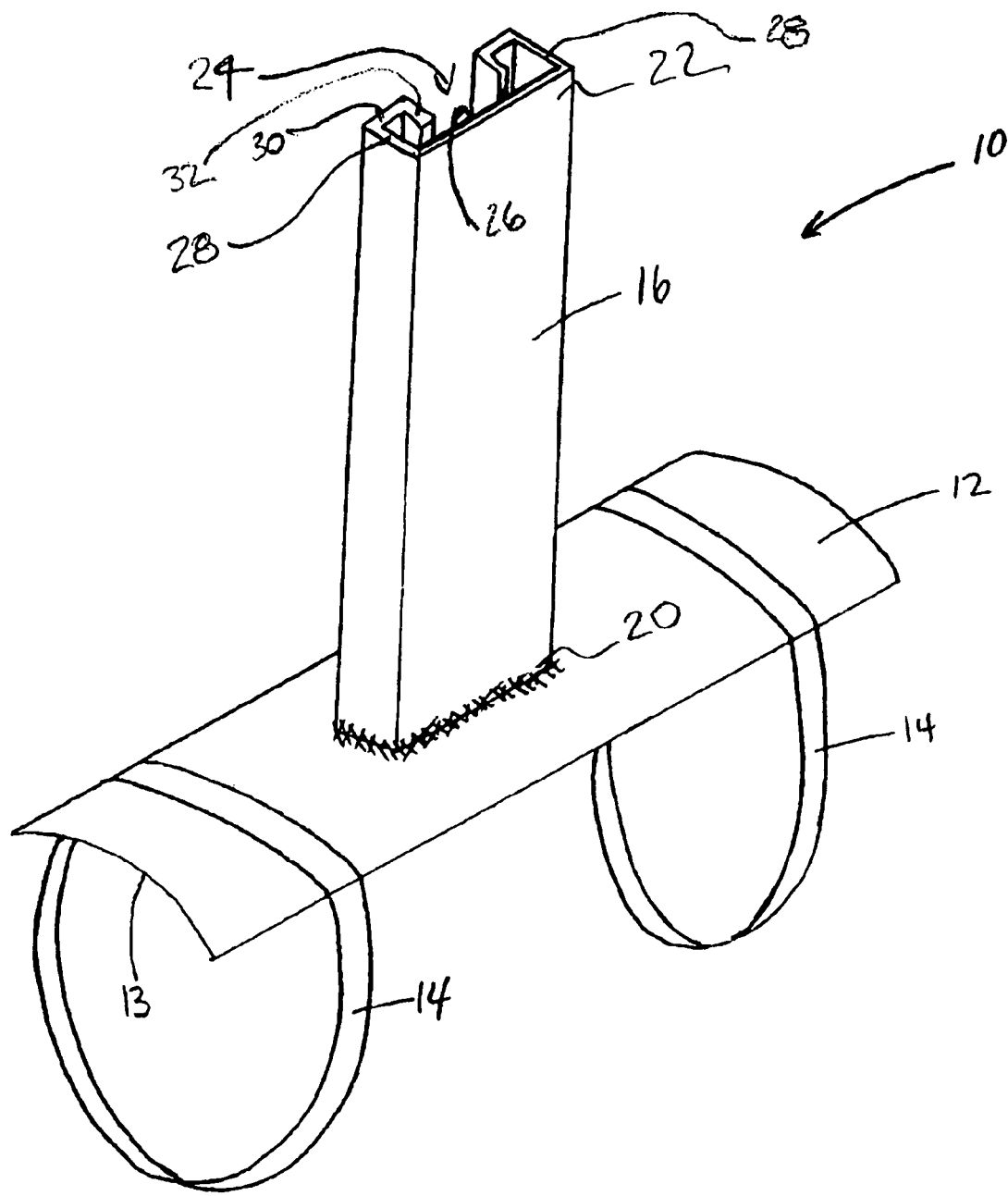
FIG. 1 is a perspective view of a bracket for mounting various accessories on industrial pipes of different diameters in accordance with a preferred embodiment of the present invention.

FIG. 1 shows a universal mounting bracket 10 adapted to be mounted to industrial pipes of various diameters to support thereon a variety of components, such as electrical wiring, electrical junction boxes, piping, cable or instrument tray, instrument air lines, glycol heat trace lines and other pieces of equipment commonly used in the oil/gas and water treatment industries.

The bracket 10 generally comprises a saddle 12 in the form of a rectangular base plate having a smooth arcuate bottom surface 13 adapted to be placed directly against a pipe. It is understood that the base plate could be of any other shape. The bracket 10 is specifically well suited to be mounted on insulated industrial piping, 4 inches to 24 inches in diameter with an added 2 inches of heat resistant insulation and a protective aluminum sheeting cover. The smooth saddle shape of the base plate allows the bracket 10 to be mounted directly on the insulation protective cover, because it contours the pipe, thus evenly distributing the weight over the entire surface area of the contact zone. Therefore, the bracket 10 can be mounted without damage to insulation and without heat transfer to the items mounted on the bracket 10, the insulation protective cover of the pipe acting as a thermal barrier to prevent heat transfer to the equipment supported by the bracket 10. This constitutes a major advantage over known support brackets that cannot be mounted to the exterior of the insulation of the piping as it would damage the outer protective liner over the insulation. Although the bracket 10 is specifically designed to permit mounting on insulated pipes, it is understood that the bracket 10 could also be directly installed on a non-insulated industrial pipe.

A pair of removable flexible bands 14 is provided at opposed ends of the saddle 12 for releasably securing the saddle 12 in position on the pipe. Each band 14 is preferably provided in the form of ½ inch aluminum or stainless steel banding. The bands 14 can be adjusted to virtually fit any pipe size. Other types of clamping bands adapted to encircle the pipe could also be used to clamp the saddle 12 in position against the outer surface of the pipe. For instance, hose clamps or straps with transversal ratchet teeth could also be used to affix the saddle 12 to the pipe. Slotted holes could be defined in the saddle 12 for receiving the clamping bands or straps. Other adjustable attachment means or connectors are contemplated as well.

The bracket 10 further includes a universal extruded aluminum rail 16 of the type often used in the electrical industry and which is configured to accept more than 100 different fastening devices presently used in this industry. It is understood that the rail 16 could be made of any other corrosion resistant material, such as plastic and composite materials. The extruded aluminum rail 16 is welded in an upright position to the top of the saddle 12. According to the illustrated embodiment, the rail 16 projects at right angles from the top surface of the saddle 12. Alternatively, it could be welded at other angles to the saddle 12. The rail has a proximal end 20 welded to the saddle 12 and a free distal end 22. The rail 16 defines an axially extending channel 24 having a bottom surface 26 from opposed sides of which projects a pair of side walls 28. Each side wall 28 is bent inwardly at 90° to define a top wall surface 30 extending in parallel to the bottom surface 26. Each top wall surface 30 is provided at an inner end thereof with an in turn lip 32 extending towards the bottom surface 26 and parallel to the sidewalls 28. The lips 32 define therebetween an axially extending slot for allowing a rail engaging member to be captively inserted into the channel 24. In the illustrated embodiment, the channel 24 opens on a side of the saddle 12. However, it is understood that the rail 16 could be welded to the saddle 12 with the open side of the channel 24 facing one end of the saddle 12 or at angles less than or greater than 90° as needed.

The bracket 10, including the saddle 12, the rail 16 and the banding 14, is preferably manufactured out of aluminum rather than plastic or even stainless steel because the pure aluminum composition thereof enables it to withstand harsh environmental treatment from exposure to the most corrosive atmospheres, which is required by the industries. The reason it is possible to use a heat conducting material such as aluminum in contact with industrial piping and steam lines heated up to 350 degrees Celsius, is due to the outer insulation protective cover of the pipes. Heat transfer to items mounted on the bracket 10 does not occur because the insulation acts as a heat barrier, blocking the heat from traveling from one medium to the other. Although aluminum is the preferred material, other material could be used depending on the environment in which it is used. For instance, the bracket 10 could be made out of a material which is U.V. rated as it would be in direct sun light in 60% of its intended use.

Figure 2:
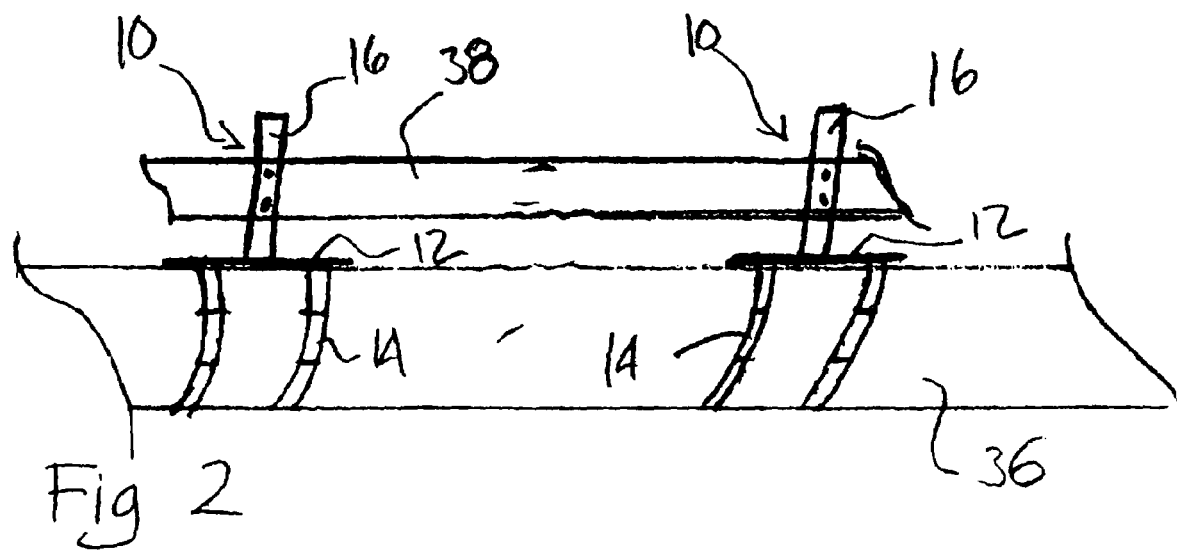
FIG. 2 is a schematic side view of an industrial pipe on which a pair of axially spaced-apart support brackets are mounted for supporting a cable tray at a desired distance away from the pipe in accordance with one potential application of the present invention.
Figure 3:
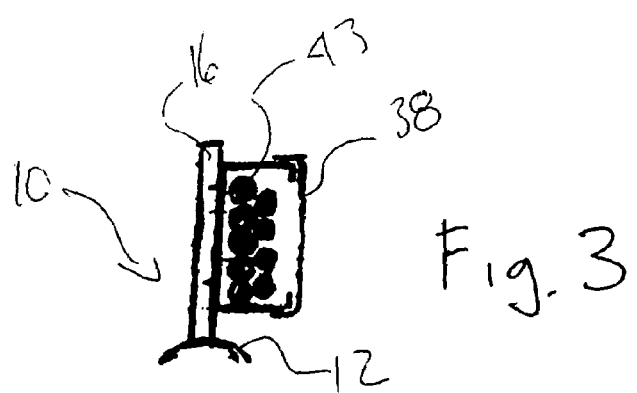
FIG. 3 is a schematic end view of the cable tray with electrical wires supported by the brackets shown in FIG. 1.

FIG. 2 is a side view of an industrial pipe 36 on which a pair of brackets 10 are attached with ½" aluminum or stainless steel banding 14. Standard fastening devices are slidably engaged in the rails 16 of the brackets 10 to support a cable tray 38 of the type commonly used in the industry to house a bundle of electrical wires 43 (see FIG. 3). The position of the fastening devices along the rails 16 can be adjusted as desired in order to mount the tray 38 at a given distance from the outer surface of the pipe 36.

Figure 4:
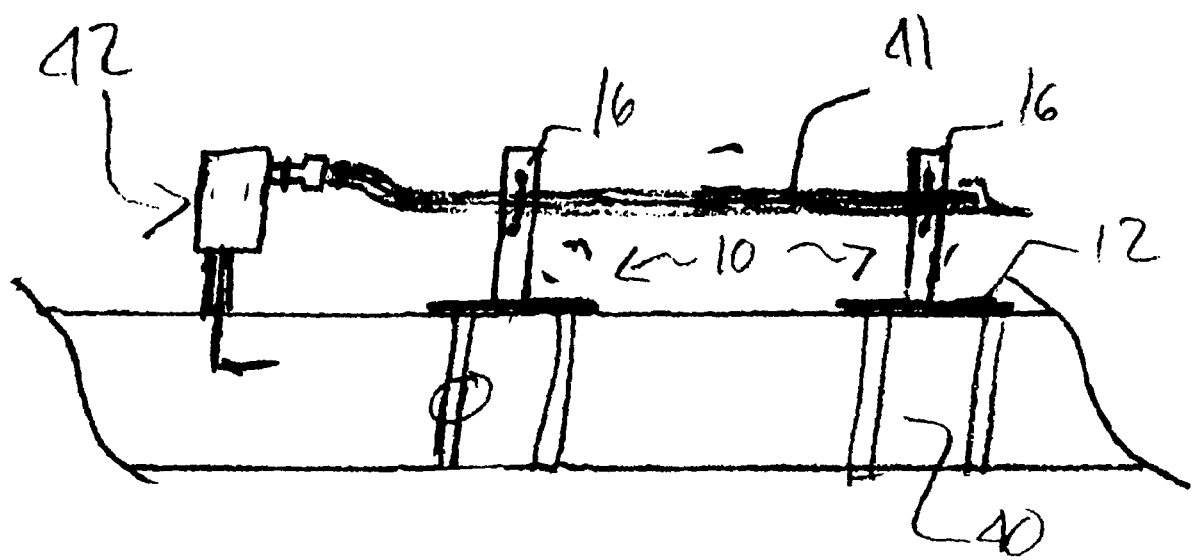
FIG. 4 is a schematic side view of an industrial pipe on which a number of support brackets are mounted for supporting a plurality of electrical cables connected to a temperature or pressure measurement transmitter mounted on the pipe in accordance to a further potential application of the present invention.

FIG. 4 illustrates another potential application of the present invention and wherein a pair of brackets 10 is releasably secured in position on a pipe 40 to support electrical cables 41 connected to a temperature or pressure measurement transmitter 42 directly mounted on the pipe 40.

The present invention could also be used to mount equipment on various flat surfaces (building studs, flat steel, etc.). In this case, the base plate or saddle 12 would be flat. Holes (not shown) could be defined in each corner of the plate for receiving a fastener, such as a screw or a nail.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A bracket and pipe arrangement comprising a pipe, an insulation liner covering the pipe, a first bracket and a piece of equipment to be mounted to the pipe, the first bracket supporting the piece of equipment at a certain distance away from the pipe, the first bracket comprising a base having an arcuate bottom surface embracing an outer surface of the insulation liner of the pipe, fastening means for securing said base in position on the outer surface of the insulation liner, a rail extending from the base in a direction away from said bottom surface thereof, said piece of equipment being adjustably mounted along said rail and securable at various axial positions therealong, a second bracket mounted on the insulation liner of the pipe at an axially remote location from the first bracket, the first and second brackets holding wiring extending in a lengthwise direction of the pipe, wherein the wiring is received in a cable tray supported by the first and second brackets at a distance from a peripheral surface of the pipe.

2. A bracket and pipe arrangement as defined in claim 1, wherein said rail has an upstanding position relative to said base.

3. A bracket and pipe arrangement as defined in claim 2, wherein said rail defines a C-shaped channel having a longitudinal axis perpendicular to said base.

* * * * *